May 28, 1940.  T. W. RUNDELL  2,202,803
REFRIGERATION APPARATUS
Filed April 30, 1938  3 Sheets-Sheet 1

WITNESSES:

INVENTOR
THEODORE W. RUNDELL.
BY
ATTORNEY

May 28, 1940.  T. W. RUNDELL  2,202,803
REFRIGERATION APPARATUS
Filed April 30, 1938  3 Sheets-Sheet 3

WITNESSES:

INVENTOR
THEODORE W. RUNDELL.
BY
ATTORNEY

Patented May 28, 1940

2,202,803

UNITED STATES PATENT OFFICE 2,202,803

REFRIGERATION APPARATUS

Theodore W. Rundell, Springfield, Mass., assignor to Westinghouse Electric & Manufacturing Company, East Pittsburgh, Pa., a corporation of Pennsylvania Application April 30, 1938, Serial No. 205,330

9 Claims. (Cl. 62—103)

This invention relates to food storage containers in mechanical refrigerators and more especially to containers for storing fresh meats and similar perishable comestibles. For best results, fresh meats should be stored at temperatures slightly above the freezing temperature of the meat and in an atmosphere of high humidity.

One object of this invention is to provide a food storage container in a mechanical refrigerator operating at normal refrigerating temperatures, which container is maintained at low temperatures and in which a high humidity may be maintained.

Another object of this invention is to provide a food storage container of the class described which is also adapted to collect the condensate dripping from the cooling unit of the refrigerator.

Another object of the invention is to provide a food storage container of the class described in which the food is readily accessible and in which the several parts of the container are removable from the cabinet.

These and other objects are effected by my invention as will be apparent from the following description and claims, taken in connection with the accompanying drawings forming a part of this application, in which:

Figure 1:
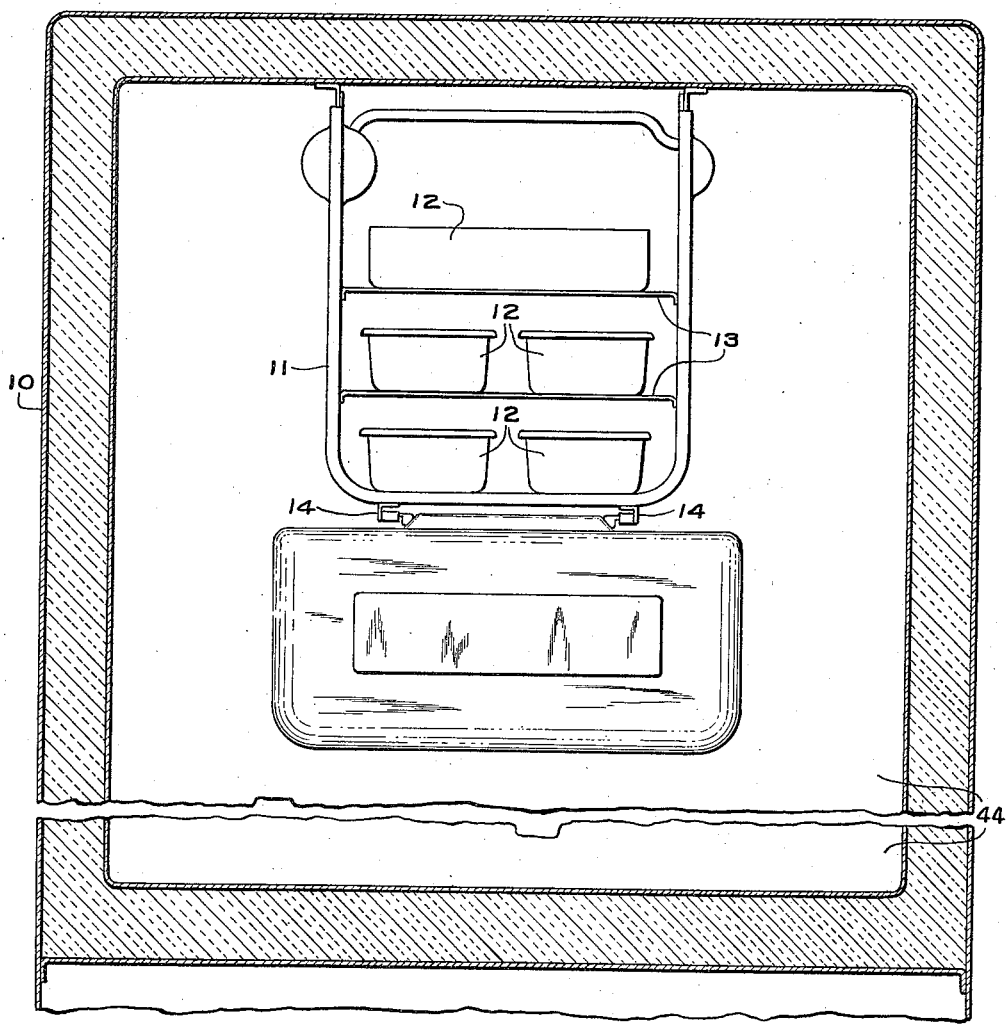
Fig. 1 is a vertical section of a portion of the cabinet of a domestic refrigerator showing the evaporator, the main food compartment, and the food storage container.

Referring now specifically to Fig. 1 for a detailed description of the invention, 10 is a cabinet for a domestic refrigerator, on the upper wall of which is secured a U-shaped evaporator 11 comprising the cooling unit of the refrigerator. This evaporator 11 is maintained at sub-freezing temperatures and is adapted to freeze water in the ice trays 12 supported on the bottom and on the shelves 13 within the evaporator 11.

Figure 2:
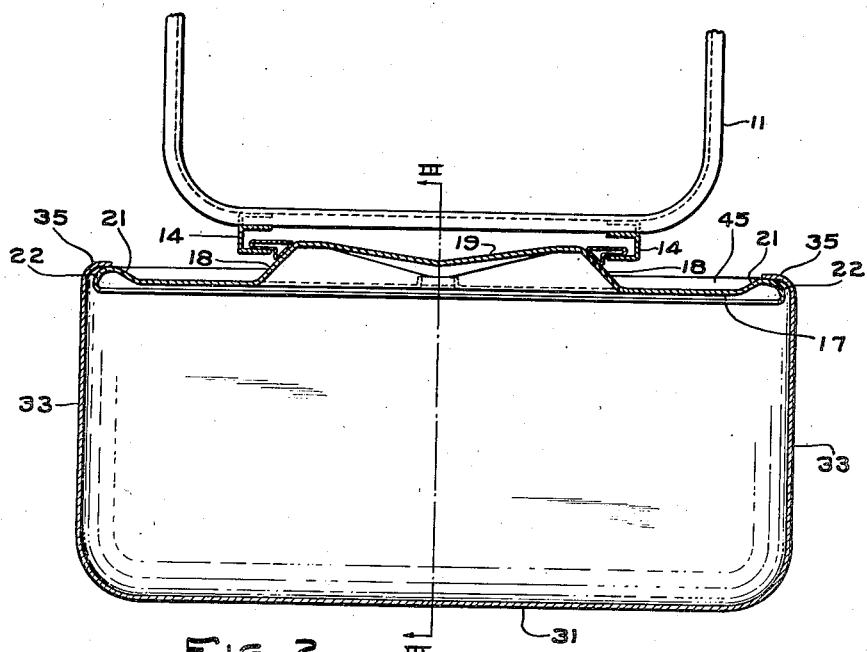
Fig. 2 is an elevation of the lower portion of the evaporator and a vertical section of the food storage container taken on the line II—II of Fig. 3.
Figure 3:
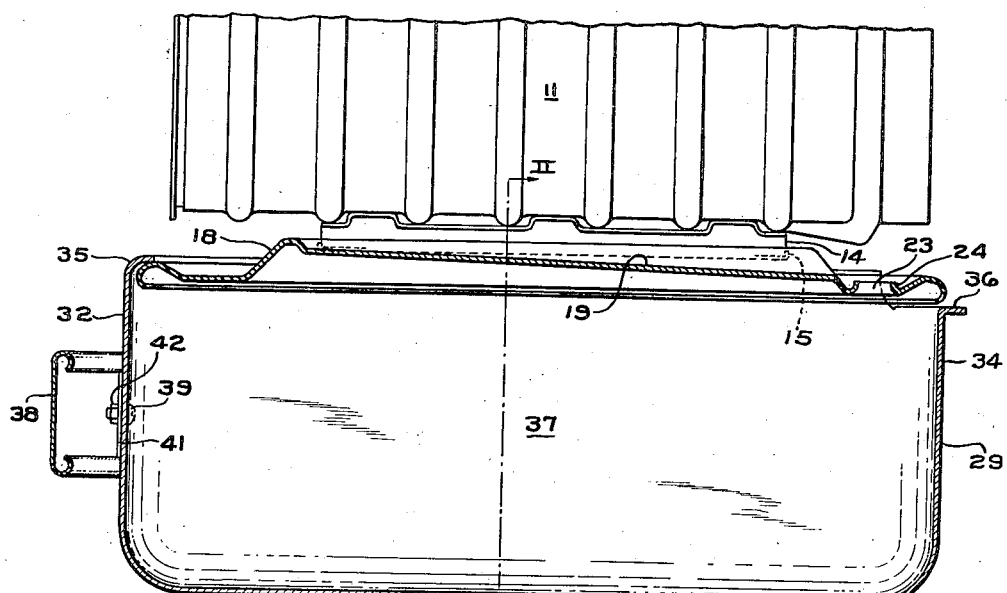
Fig. 3 is an elevation of the lower portion of the evaporator and a vertical section of the food storage container taken on the line III—III of Fig. 2.
Figure 4:
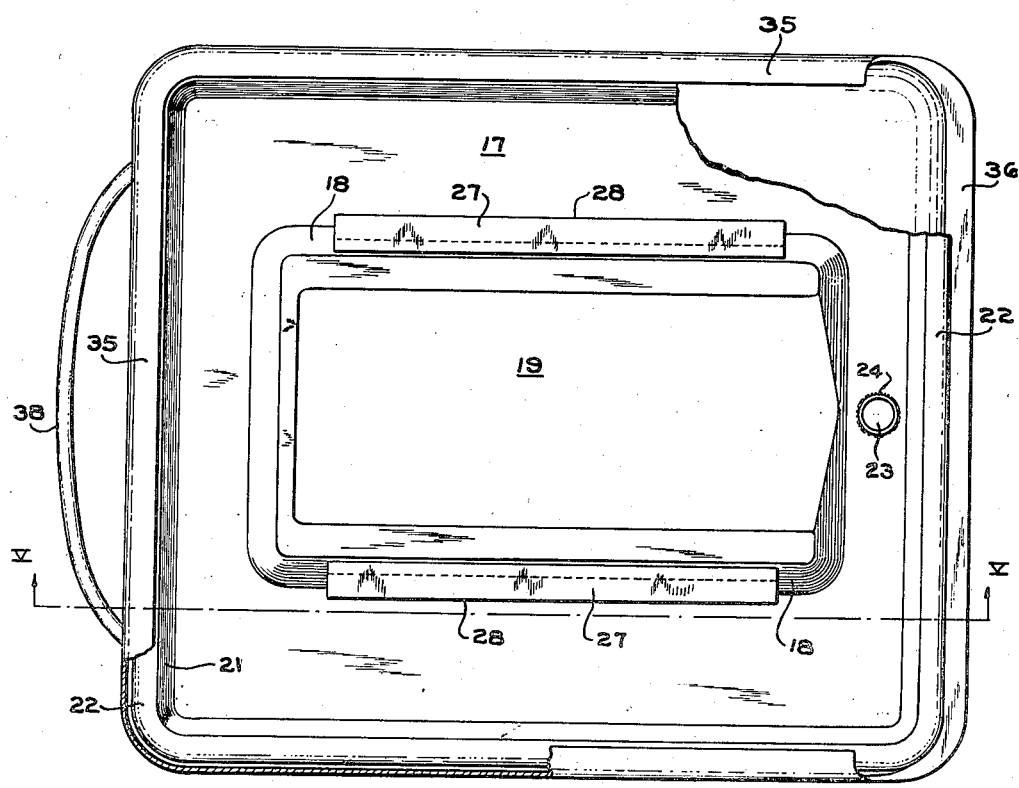
Fig. 4 is a plan view of the food storage vessel and the cover positioned thereon with parts of the cover and the vessel broken away.
Figure 5:
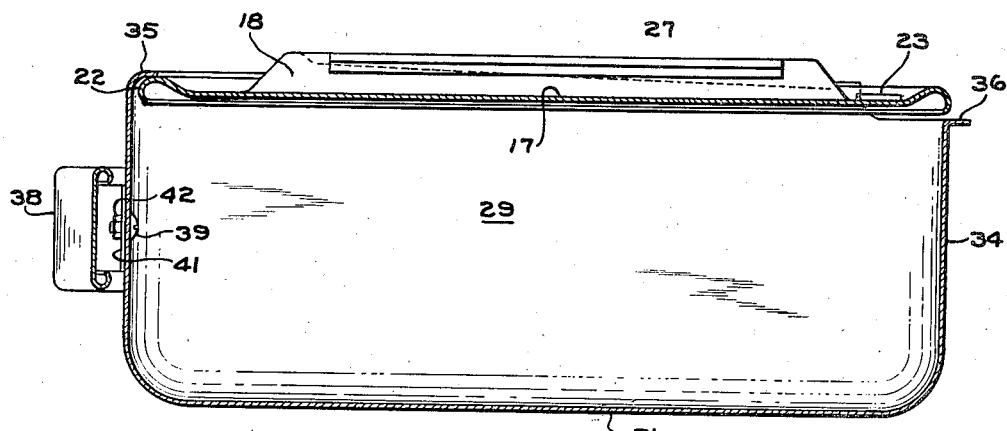
Fig. 5 is a vertical section on the line V—V of Fig. 4.

Immediately below the evaporator 11 is suspended the food container of this invention, and to this end two U-shaped channels 14 are secured to the base of the evaporator 11 which channels are turned so that their open portions face one another. The details of these channels 14 are more clearly shown in Figs. 2, 3, and 6. Each end of these U-shaped channels 14 is partially closed by a lug 15 integral with the lower leg 16 of the respective U-shaped channels, which lug 15 is bent upwardly in a plane perpendicular to the axis of the channel 14. The lugs 15 close approximately the lower half of the open space at each end of the U-shaped channel 14.

Referring now more particularly to Figs. 2, 3, 4 and 5, a cover 17 is formed from a substantially rectangular sheet of metal on which are embossed two spaced-apart longitudinal ridges 18. The metal between the ridges is formed in the shape of a trough 19 which is inclined downwardly toward the rear of the cover 17. The edges 21 of the cover are turned obliquely upward, and are then rolled downwardly at their extreme edges 22 to smoothen and reinforce these portions. On the base of the metal cover 17 towards the rear is a circular opening 23, the edges 24 of which are turned upwardly to approximately one-half the height of the upwardly inclined edges 21 of the cover 17. The function of the trough and the upturned edges will be explained later.

Figure 6:
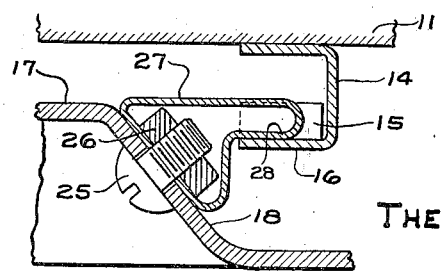
Fig. 6 is a detailed vertical section of the supporting elements of the food storage container.

The outer sides of the ridges 18 of the cover 17 are provided with sidewardly extending flanges 27 secured by means of bolts 25 and nuts 26, as shown particularly in Fig. 6. These flanges 27 are formed of tubular material bent into a sectional form simulating a right angle triangle with a projection 28 extending on one of the sides.

The projections 28 of the flanges 27 on the cover 17 are spaced and proportioned to engage the lower legs 16 of the U-shaped channels 14 secured to the base of the evaporator 11 and are of a length slightly less than that of the U-shaped channels 14 so that they lie between the upturned end flanges 15 of the channels. The projections 28 on the flanges 27 may be slid into the channels 14 through the open areas above the lugs 15.

From the apparatus thus far described, it will be apparent that the cover 17 is adapted to be supported beneath the evaporator 11 and to rest by means of the projections 28 on the legs 16 of the U-shaped channels 14 secured to the evaporator 11 and that when in this position the upturned end lugs 15 of the channels 14 will hold the cover 17 against endwise movement.

When the cover 17 is supported below the evaporator 11 in this manner, the upturned portions 21 of the edges of the cover 17 and of the edges 24 of the opening 23 together with the base portions of the cover 17 form a storage space for the condensate which may drip from the evaporator 11 during the cycling periods of the apparatus or during short periods of power failure. The inclined trough-shaped portion between the parallel ridges 18 conducts the moisture dripping on this area to the lower portions of the cover 17. By lifting the cover 17 so that the projections 28 on the flanges 27 slide over the upturned lugs 15, the cover 17 may be removed from its support on the U-shaped channels 14, to discharge the moisture collected on the cover 17 and to clean the same.

The cover 17 is adapted to support a vessel 29 immediately below it. This vessel 29 is formed from a single sheet of metal and has a base 31 and upturned walls 32, 33 and 34. The upper edges 35 of the walls 32 and 33 at the front and sides of the vessel 29 are rolled inwardly to provide hooking members engageable with the cover 17. The rear wall 34 is somewhat lower than the front and side walls 32 and 33 and its edge 36 is bent backwardly at right angles to reinforce the edge. The proportions of the vessel 29 are such that the inwardly turned edges 35 may be slid over the rolled edges 22 of the cover 17, and that the cover 17 partially overlies the upper edge 36 of the rear wall 34 of the vessel 29 when the latter is fully slid in place. This vessel together with the cover 17 forms the meat storage container 37 which stores and shields the meat from the drying atmosphere prevailing in the main food chamber.

A handle 38 is secured to the front wall 32 of the vessel 29 by the bolts 39 passing through this wall 32 and engaging an inwardly turned end flange 41 of the handle through the nuts 42.

It will be apparent from the apparatus thus far described that when the cover 17 is supported by the U-shaped channels 14 below the evaporator 11 that the vessel 29 may be slid backwardly into engagement with the cover 17 and depend therefrom. A mere forward pull on the handle 38 will disengage the vessel 29 from the cover 17 and leave the latter in engagement with the evaporator 11.

When storing meat in the container 37, the main food compartment 44 in the refrigerator is maintained at the usual food storage temperature which is substantially above freezing temperature. The meat storage container 37, because of its position below the evaporator 11 and because of the metallic heat conducting paths comprising the U-shaped channels 14 and the flanges 27, is maintained at a temperature intermediate that of the evaporator 11 and the main food storage chamber 44. Its position and the connecting heat conducting paths are proportioned so that at ordinary operating temperatures of the refrigerator, the meat storage container 37 is maintained at slightly above freezing temperatures.

The evaporator 11 may be defrosted when no meat is in the meat storage chamber 37, for the condensate in excess of the storage capacity of the cover 17 will drain through the opening 23 into the vessel 29. This opening 23 together with a gap between the cover 17 and the rear wall 34 of the vessel 29 also permits a restricted ventilation of the storage chamber 37 to prevent surface spoilage of the comestibles stored therein.

From the foregoing, it is apparent that this invention provides a ventilated storage container within an ordinary domestic refrigerator, in which container fresh meats and similar perishable comestible may be stored at a suitable temperature and humidity without necessitating a change in the customary operating temperature of the refrigerator.

Furthermore, the storage vessel and its cover forms containers for catching and storing the condensate dripping from the evaporator. The container also forms a convenient storage space for foods since a pull on the handle disengages the storage vessel from the evaporator and exposes the foods contained therein.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. In a mechanical refrigerator, in combination, a cabinet, a cooling unit therein, means for slidably engaging a cover element to and in depending relationship to said cooling unit, said means having a stop member for preventing accidental withdrawal of said cover element, and a food storage vessel slidably engaging said cover element and depending therefrom.

2. In a mechanical refrigerator, the combination of a refrigerator cabinet, a cooling unit therein, a food storage vessel disposed below said cooling unit, a cover member for said food storage vessel suspended from said cooling unit and in heat conducting relationship therewith, and means for normally retaining said cover member in a fixed position relative to said cooling unit, said means, however, affording intentional removal of said cover member, said food storage vessel being slidably suspended from said cover member.

3. In a mechanical refrigerator, in combination, a cabinet defining a main food chamber maintained at non-freezing temperatures, a cooling unit therein defining a freezing zone, a metallic cover member suspended below and in heat conducting relationship with said cooling unit, said cover member having an upturned edge to form a liquid storage space for condensate dripping from said cooling unit and a vessel immediately below said cover member and forming therewith a substantially closed food container.

4. The combination defined in claim 3 in which a means is associated with the cover member for conducting excessive condensate from the liquid storage space in said member to the vessel.

5. The combination defined in claim 3 wherein the cover member has an opening therein above the bottom level of the liquid storage space and below the level of the upturned edge for conducting condensate from the liquid storage space in said cover to said vessel, said opening also permitting a limited circulation of air through said vessel.

6. In a mechanical refrigerator, in combination, a cabinet defining a main food chamber maintained at non-freezing temperatures, a cooling unit therein defining a freezing zone, a metallic food container in said main food chamber, said food container having its upper portion in heat conducting relationship with said cooling unit and openings in said food container for permitting a limited circulation of air therethrough.

7. In a mechanical refrigerator, in combination, a cabinet defining a main food storage chamber maintained at non-freezing temperatures, a cooling unit exposed to said chamber, said cooling unit defining a freezing zone, a metallic cover member in heat conducting relationship with said cooling unit, and a vessel immediately below said cover member and forming therewith a substantially closed food container, said food container having a wall surface exposed to the interior of said main food storage chamber, said heat conducting relationship and said exposed wall surface of the container maintaining the temperature of the vessel at slightly above freezing during normal operation of the refrigerator.

8. In a mechanical refrigerator, in combination, a cabinet defining a main food chamber maintained at non-freezing temperatures, a cooling unit therein defining a freezing zone, a metallic cover member below the cooling unit and in heat conducting relationship therewith, and a vessel immediately below said cover member and forming therewith a substantially closed food container, said food container having large portions of its outer surface exposed to said food chamber.

9. In a mechanical refrigerator, in combination, a cabinet defining a main food chamber maintained at nonfreezing temperatures, a cooling unit exposed to said chamber, said cooling unit defining a freezing zone, a metallic cover member slidably suspended below the cooling unit and in heat conducting relationship therewith, and a vessel immediately below said cover member and forming therewith a substantially closed food container.

THEODORE W. RUNDELL.